United States Patent [19]

Wilkinson

[11] 4,308,836
[45] Jan. 5, 1982

[54] MANIFOLD FOR ROTARY ENGINES

[76] Inventor: Charles E. Wilkinson, 1110 Burleson, Grand Prairie, Tex. 75050

[21] Appl. No.: 49,643

[22] Filed: Jun. 18, 1979

[51] Int. Cl.³ ............................................. F02B 53/00
[52] U.S. Cl. ................................ 123/44 D; 123/44 C
[58] Field of Search ................ 123/44 R, 44 D, 44 C, 123/234, 236, 237

[56] References Cited

U.S. PATENT DOCUMENTS

| | | | |
|---|---|---|---|
| 1,583,560 | 5/1926 | Morris | 123/44 D |
| 2,193,178 | 3/1940 | Laythorpe | 123/236 |
| 3,726,259 | 4/1973 | Graves | 123/236 |
| 3,848,575 | 11/1974 | Williams | 123/236 |
| 4,154,208 | 5/1979 | Kunieda | 123/236 |

Primary Examiner—Charles E. Phillips
Attorney, Agent, or Firm—Donald W. Margolis; H. Kenneth Johnston, II

[57] ABSTRACT

A cylindrical manifold consisting of two sections back to back, each section having various chambers, the first section having an intake and compression chamber and the second section having an intake, combustion, and exhaust chamber.

6 Claims, 4 Drawing Figures

Fig_1

4,308,836

MANIFOLD FOR ROTARY ENGINES

BACKGROUND OF THE INVENTION

Manifolds for rotary engines have consisted of porting directly into the cylinders of the rotary engine in which the complete four strokes of the internal combustion engine take place in a single cylinder-piston combination. This has caused (additional) absorption of energy. Present rotary type engines have substantial additional energy requirements due to the shock incurred from firing and also due to the considerable amount of reciprocating vibration caused by the rotation of the engine. As in most internal combustion engines, there is a substantial amount of weight required due to the structural strength requirements of the system.

SUMMARY OF THE INVENTION

The present invention consists of a manifold having two sides, a compression side and a power side. The gas flow in the compression side is 180° opposite to that of the direction of flow for the power side. The present invention eliminates or reduces recipricating vibrations, the shock incurred from the firing, and further eliminates or reduces the vibrations incurred in the rotary assemblies. The present invention, because of the opposite flow of gases, allows a reduction in weight due to the fact that the material strengths are reduced as a result of the reduced reciprocating energies. There is a simplicity in the operation of the engine due to the fact that there is no valve timing train or camming action required as linear internal combustion type engines require.

The present invention consists of a first half with ports in the intake chamber for intaking gaseous mixtures into the cylinder/piston combination and a second half of the compression section has and compression chamber and exhausting port to transfer the compressed gaseous mixture into the power section. The power section then takes the already compressed gaseous charge, and further compresses it. At the same point in the cycle, but in opposite direction ignition and compression both occur, thus eliminating the rotary vibration.

The present manifold allows the power cycle to operate in a two-cycle mode with four cycle capability, due to the compression cycle of the first side. An additional benefit obtained by the present invention is that there is no reciprocating weight to absorb energy produced by the combustion. The present invention separates the strokes such that as the intake and compression strokes are produced by one set of piston/cylinders at the compression side of the manifold, the ignition and power strokes are completed by a separate set of piston/cylinders rotating in an opposite direction at the power side of the manifold. In combination, the manifold allows the complete four cycles to transpire; however, only one half of the four cycles occur in each set of pistons and cylinders, and because of the opposite rotation of the compression piston/cylinder combination and the firing power piston/cylinder combination the reciprocating and vibrational energies are reduced.

DETAILED DESCRIPTION OF THE INVENTION

Figure 1:
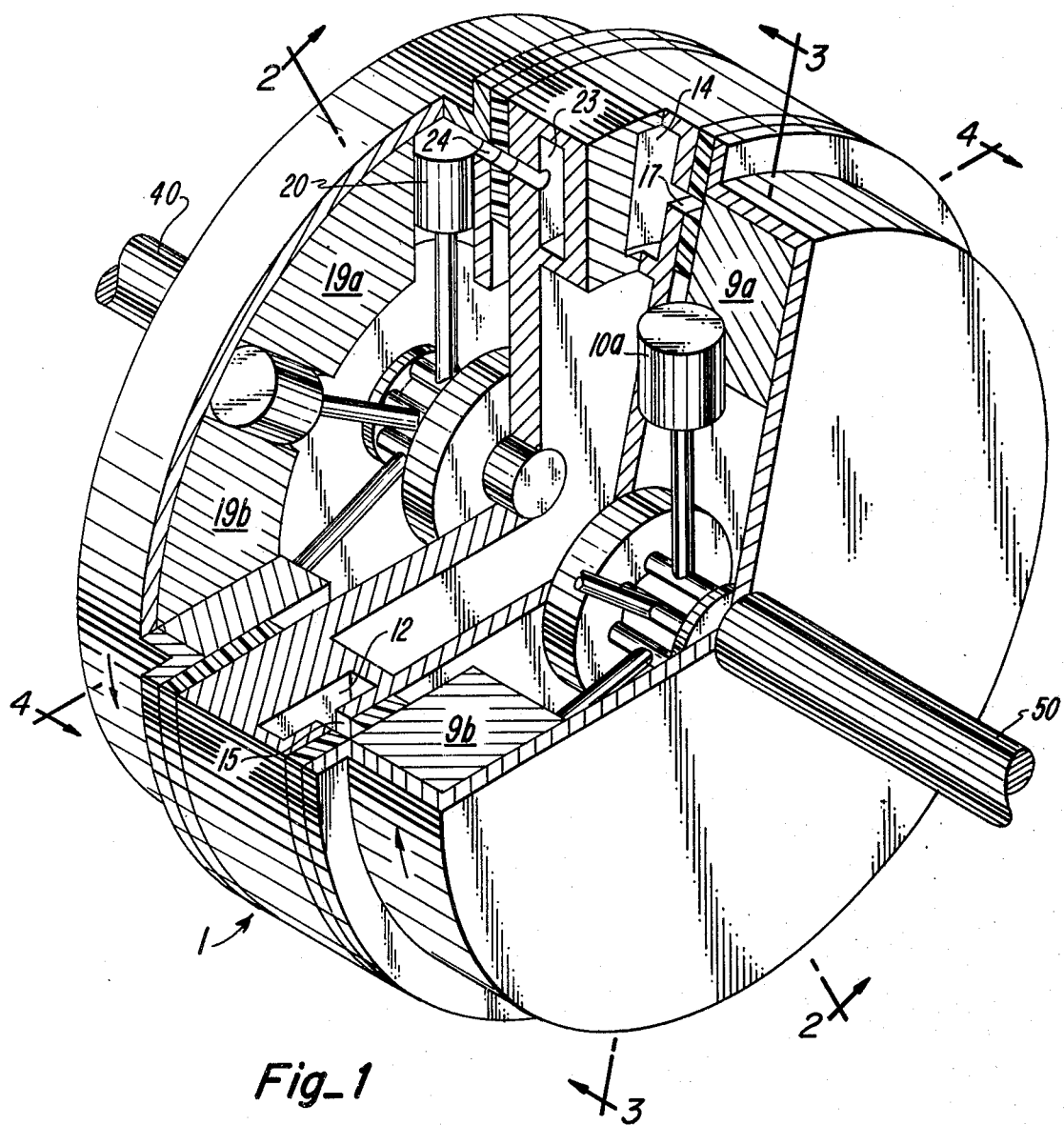
FIG. 1 is a perspective view partially cut away of the manifold and piston/cylinder assembly of the present invention.
Figure 2:
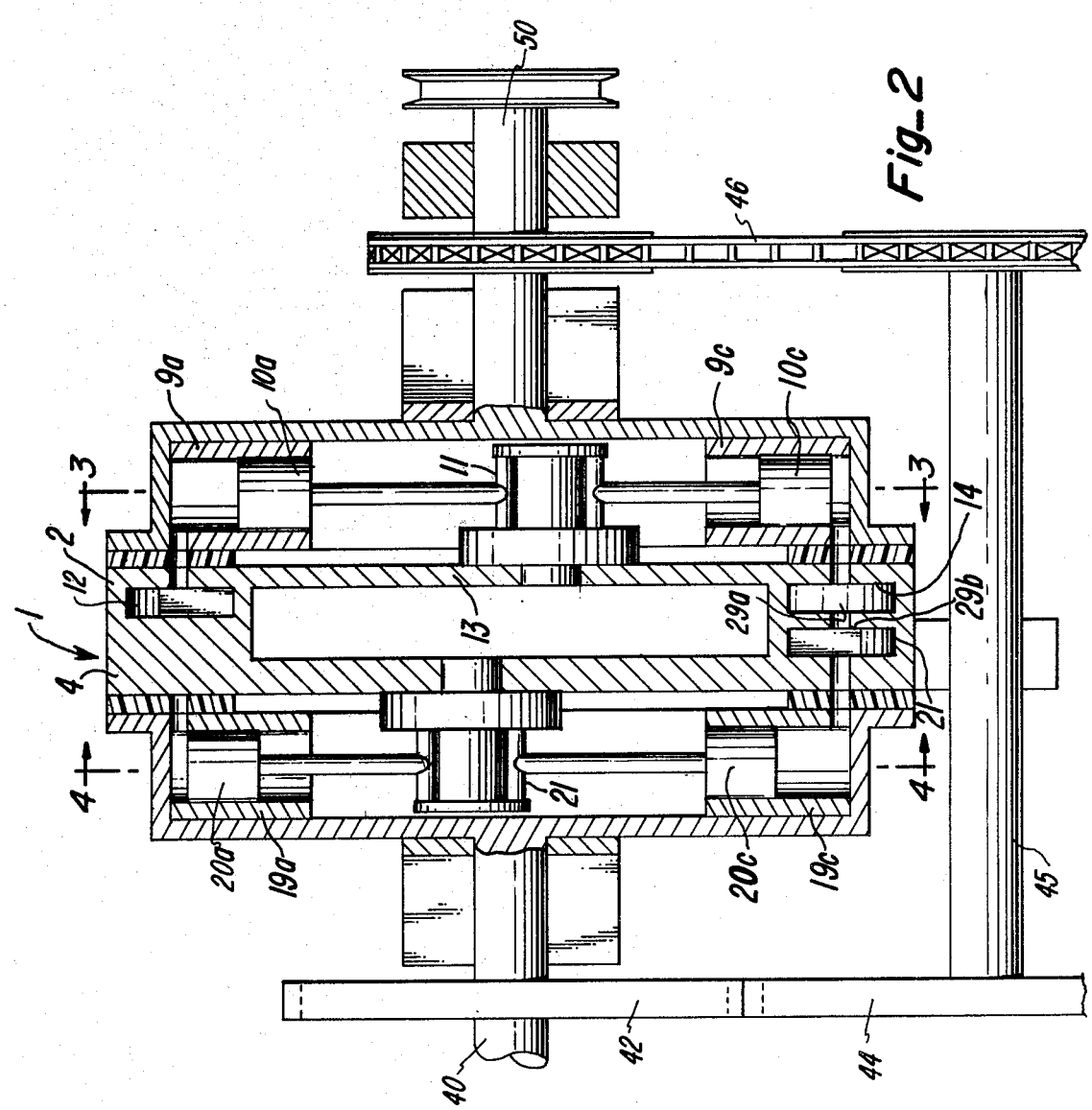
FIG. 2 is a cross-sectional view of the manifold and piston/cylinder assembly along lines 2—2 of FIG. 1.

Referring initially to FIGS. 1 and 2, manifold 1 of the present invention includes two separate, but interacting sections or cylindrical housings. These are a compression section 2, shown on the right hand portion of the system and a power section 4, located on the left hand portion of the system. Both sections are associated with their own piston/cylinder combinations 10/9 and 20/19 which interact with them and with the gases to be distributed by the manifold, as described in more detail hereinafter.

Figure 3:
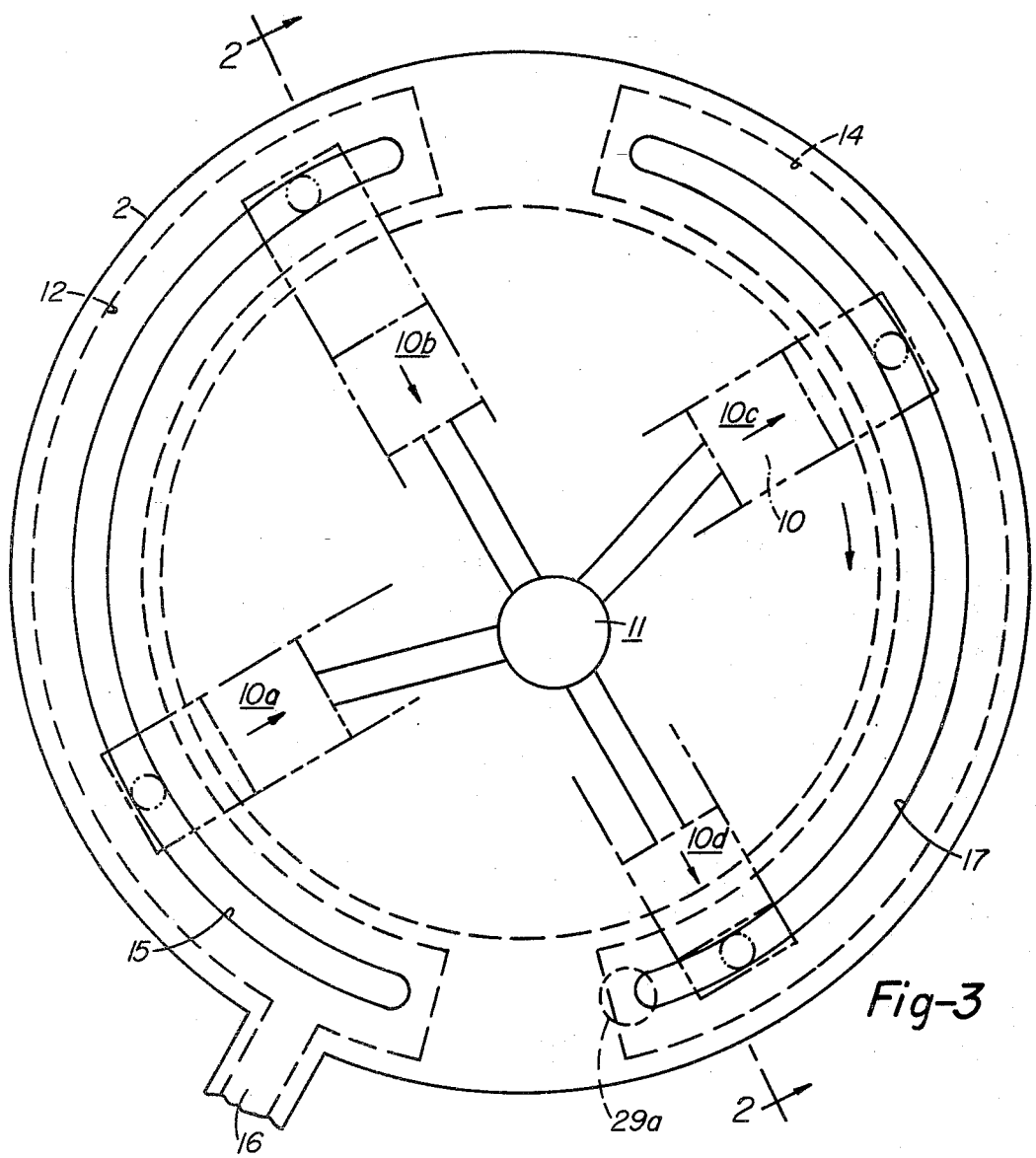
FIG. 3 is a cross-sectional view of the compression side of the manifold along lines 3—3 of FIG. 1.

As is shown in additional detail in FIG. 3, compression section 2 of the manifold of the present invention has two separate arcuate chambers, intake chamber 12 and compression chamber 14, each shown in phantom. Associated with intake chamber 12 is a first opening 16, which serves as an intake port for gaseous material into chamber 12, and arcuate port 15 generally coinciding with and along the length of intake chamber 12. Port 15 opens to piston/cylinder assemblies, for example 9a/10a and 9b/10b.

The second portion of compression section 2 is compression chamber 14, which is also arcuate, but separated from intake chamber 12. Port 17 opening into compression chamber 14 is also arcuate in shape and generally coincides with and along the length of compression chamber 14. Opening from chamber 14, near its extreme clockwise end is port 29a, shown in phantom.

Pistons 10a, 10b, 10c and 10d are swingably mounted on shaft 11, with shaft 11 being supported and mounted for rotation in wall 13. As most clearly shown in FIG. 2, shaft 11 is mounted off-center or eccentrically within compression section 2. Associated with each piston is a pair of cylinder walls 9a, and 9b, for example, most clearly shown in FIGS. 1 and 2. Cylinder walls 9a, 9b, 9c, etc. are mounted for rotation, along with their associated pistons, within compression section 2.

As described in more detail hereinafter, the off-center mounting of the pistons causes them to variously provide either an intake action or a compression action to chambers 12 and 14, respectively.

Figure 4:
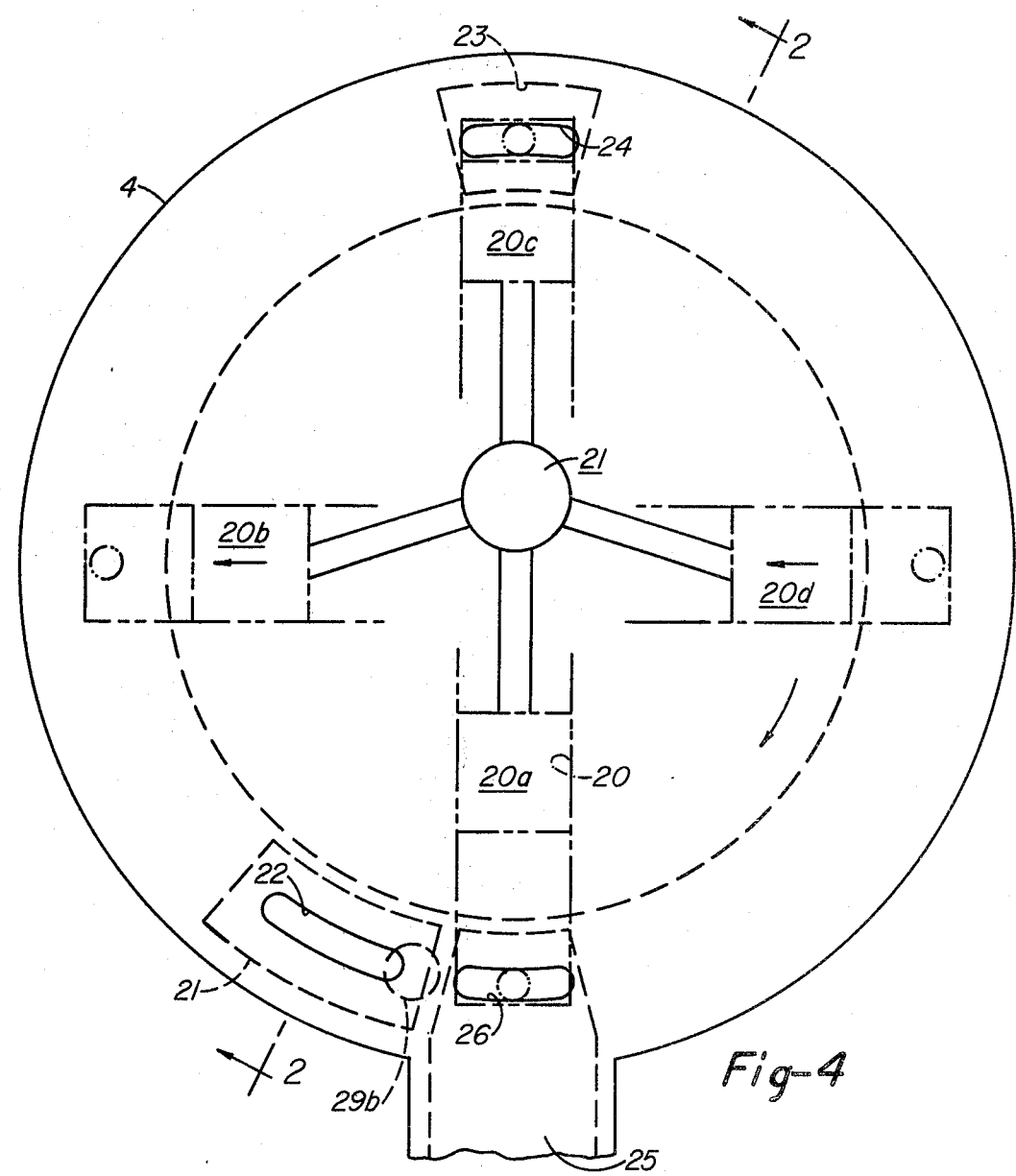
FIG. 4 is a cross-sectional view of the power side of manifold along lines 4—4 of FIG. 1.

Power section 4 includes three separate chambers, compression chamber 21, combustion chamber 23, and exhaust chamber 25, as shown in substantial detail, for example in FIGS. 2 and 4. Associated with compression chamber 21 is port 29b, which is an extension of and is in gas transmitting connection to port 29a of compression chamber 14 in compression section 2. Compression chamber 21 is generally arcuate in shape and includes a second opening, port 22 generally coinciding with and along its length. Port 22 opens to piston/cylinder assemblies 20/19, described in more detail hereinafter. Combustion chamber 23, separate from compression chamber 21, is also generally arcuate in shape and includes a single opening, port 24, to the piston/cylinder assemblies. Finally exhaust chamber 25, carried by power section 4 includes a first opening, port 26, to the piston/cylinder assemblies, and a second opening leading externally of the manifold system.

In power section 4, pistons 20a, 20b, 20c and 20d are swingably mounted on shaft 21, with shaft 21 being rotatively mounted in manifold wall 23 for eccentric or off-center rotation of the piston/cylinder combinations with power section 4. Associated with each piston is a pair of cylinder wall sections 19a, and 19b, for example, as shown in FIGS. 1 and 2, which cylinders walls are mounted for rotation along with their associated pistons within power section 4.

In the operation of the manifold system of the present invention, combustible gases are inserted through intake port 16 into intake chamber 12 and out along arcuate port 15. Piston/cylinder assembly 10/9 is mounted in a manner to provide fluid contact between each cylinder and a portion of port 15. The eccentric mounting of shaft 11 causes each piston, as it rotates clockwise, to progressively assume a location further and further away from intake chamber 12, thus creating a partial vacuum and causing the gaseous mixture in intake chamber 12 to be drawn into the piston/cylinder assembly. As each piston/cylinder assembly passes beyond port 15 of intake chamber 12, the gases within the cylinder above the piston remain trapped within the cylinder until the piston/cylinder assembly makes open contact with port 17 of compression chamber 14. However, in this instance, due again to the eccentric mounting of the pistons within the system, during clockwise rotation, the piston progressively approaches closer and closer and closer to the radial limit of its associated cylinder, thus applying increasing pressure to the gas in the cylinder and compressing the gas within compression chamber 14. Finally, at substantially the clockwise end of compression chamber 14, the compressed gas is forced from compression chamber 14 through port 29a, whereby it is then transferred through port 29b into compression chamber 21 of power section 4. Compression chamber 21 is open to piston/cylinder assemblies 20/19, and further clockwise rotation, as seen in FIG. 4, of that assembly causes additional compression of the gas. The compressed gas is then carried within a piston/cylinder assembly to combustion chamber 23. Compressed gas enters combustion chamber 23 through port 24, and is ignited within combustion chamber 23 whereby the expanded gases exit port 24 propelling the associated piston/cylinder assembly further in a clockwise direction. The exploded expanded gases are then carried with a piston/cylinder assembly to exhaust port 26 through which they are vented from the cylinder to exhaust chamber 25 and thence allowed to exit the system.

Although both FIGS. 3 and 4 are shown as having piston/cylinder assemblies rotating in a clockwide direction, it will be understood by reference to FIGS. 1 and 2 that in operation the chamber of FIG. 3 and the chamber of FIG. 4, as shown, are back to back so that in operation the piston/cylinder combination rotate in opposite directions in compression section 2 and power section 4. This opposed rotation reduces vibrations and reciprocating energy produced by the system, and thus reduces the requirements for the strength of materials used in the system.

It is apparent from the foregoing description that the manifold may be made in a manner in which ports are utilized in place of the various chambers, so that on the compression side of the manifold there would be merely a port as an intake port allowing gaseous mixtures to enter a piston/cylinder combination and a transfer port transferring the compressed gaseous mixture to a piston/cylinder combination on the power side of the manifold, which would also have an ignition chamber and a port thereto and an exhaust chamber and a port. Although a manifold having this configuration will perform the desired function of the invention, one does not gain the full benefit of the chambering as described in the within invention. It should be noted however, that a manifold utilizing the ports as described eliminates additional material required as necessary to provide the chambering of the within described invention.

It will be apparent from the foregoing description that an engine utilizing the within cylindrical manifold will have the common operation and characteristics of suction, compression, ignition, expansion and exhaust processes.

What is claimed is:

1. A manifold for distributing gases in a rotary piston engine in a manner to reduce withdrawn and reciprocal energy in such engine, such engine including a first and a second cylindrical housing, each cylindrical housing including at least one piston/cylinder combination mounted for rotation within said housing, said two cylindrical housings being located in juxtiposed axial relationship to one another with the axis of each cylinder being substantially a linear extension of the axis of the other cylinder, said manifold including:

means carried by said first cylindrical housing for providing gaseous compression including an intake chamber and a compression chamber;

said intake chamber being substantially arcuate and concentric with the axis of said first cylindrical housing, said intake chamber including a first and a second opening, said first opening being to a source of external gaseous materials are located substantially at one circumferential end of said arcuate intake chamber, said second opening into said intake chamber extending along a substantial portion of the length of said intake chamber, said second opening being to the piston/cylinder combination mounted within said first cylindrical housing;

said compression chamber also being substantially arcuate and concentric with the axis of said first cylindrical housing, said compression chamber including a first and a second opening into said compression chamber, said first opening extending along a substantial portion of the length of said compression chamber and opening to the piston/cylinder combination mounted within said first cylindrical housing, the second opening into said compression chamber being located substantially at one circumferential end of said arcuate chamber and extending substantially axially through said first cylindrical housing and towards said second cylindrical housing;

said intake chamber and said compression chamber being circumferentially displaced from one another along the circumference of said cylindrical housing with the first opening into said intake chamber being located at the circumferentially greatest distance from the second opening into said compression chamber;

and wherein the piston/cylinder combination within said first cylindrical housing is mounted for rotation in the direction from said first opening in said intake chamber towards said second opening in said compression chamber, said piston/cylinder combination being mounted to move said piston progressively further from said intake chamber and progressively closer to said compression chamber during rotation in such direction;

means carried by said second cylindrical housing for providing power including a compression chamber, a combustion chamber, and an exhaust chamber;

said compression chamber being substantially arcuate and concentric with the axis of said second cylindrical housing, said compression chamber including a first and second opening into said chamber, said first opening being located substantially at one circumferential end of said arcuate chamber and in gas transmitting connection with said second opening of said compression chamber located within said first cylindrical housing, said second opening into said compression chamber extending along a substantial portion of the length of said compression chamber, said compression chamber extending circumferentially in an arc from its first opening in a direction opposite to the direction of the compression chamber within said first cylindrical housing from its second opening circumferentially along the arc of said compression chamber within said first cylindrical housing;

said combustion chamber within said second cylindrical housing being circumferentially spaced from, but serial to, said compression chamber and including a single opening to said piston cylinder combination;

an exhaust chamber circumferentially spaced from, but serial to both said combustion chamber and said compression chamber, said exhaust chamber including a first opening to said piston/cylinder combination and a second opening from said exhaust chamber external to said manifold;

and wherein said piston/cylinder combination within said second cylindrical housing is mounted for rotation in a direction from said first opening of said compression chamber circumferentially along the length of said compression chamber toward said combustion chamber, and thence toward said exhaust chamber, the direction of rotation of said piston/cylinder combination in said second cylindrical housing being opposite to the direction of rotation of the piston/cylinder combination located in said first cylindrical housing, whereby in operation when each piston/cylinder combination is causes to rotate in its preferred opposite direction, and combustible gaseous materials are passed into the first opening of said intake chamber, said gases are drawn into said intake chamber, thence in response to rotation of said piston/cylinder combination out of said second opening of said intake chamber and into the piston/cylinder combination, then, in response to further rotation, said gases are transferred into the first opening of said compression chamber, carried by said first cylindrical housing, and subjected to compression in response to further rotation of said piston/cylinder combination, said compressed gases then passing, due to pressure, from the second opening of said compression chamber to the first opening of the compression chamber carried by the second cylindrical housing and subjected to additional compressive forces due to the rotation of the piston/cylinder combination of said second cylindrical housing rotating in a direction opposite to said piston/cylinder combination of said first cylindrical housing, the thus compressed gases then being carried by, and in response to rotation of, said piston/cylinder combination of said second cylindrical housing into the opening of said combustion chamber, where, when they are subjected to ignition, they expand forcing the piston/cylinder combination to continue to rotate towards said exhaust chamber, the combustion products thence being caused to enter said exhaust chamber through its first opening and allowed to exit the manifold from its second opening.

2. A manifold for distributing gas in rotary engines as described in claim 1, wherein said arcuate intake chamber is a port for intaking gaseous materials.

3. A manifold for distributing gas in rotary engines as described in claim 1, wherein said arcuate compression chamber is a port for transferring gaseous materials from said first cylindrical section to said second cylindrical section.

4. A manifold for distributing gas in rotary engines as described in claim 1, wherein said arcuate compression chamber is a port connected to said first cylindrical section for transferring compressed gaseous materials from said first cylindrical section to said second cylindrical section.

5. A manifold for distributing gas in rotary engines as described in claim 1, wherein said arcuate power chamber is a port through which gaseous materials are ignited.

6. A manifold for distributing gas in rotary engines as described in claim 1 wherein said arcuate exhaust chamber is a port through which burned gaseous materials are expelled.

* * * * *